US011984082B2

(12) United States Patent
Bae et al.

(10) Patent No.: US 11,984,082 B2
(45) Date of Patent: May 14, 2024

(54) DISPLAY DEVICE AND METHOD OF DRIVING THE SAME

(71) Applicant: Samsung Display Co., Ltd., Yongin-Si (KR)

(72) Inventors: Min-Seok Bae, Yongin-si (KR); Changbin Im, Yongin-si (KR); Byung Ki Chun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/197,764

(22) Filed: May 16, 2023

(65) Prior Publication Data

US 2024/0112630 A1 Apr. 4, 2024

(30) Foreign Application Priority Data

Oct. 4, 2022 (KR) ........................ 10-2022-0126238

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/0264* (2013.01); *G09G 2310/08* (2013.01); *G09G 2320/0666* (2013.01); *G09G 2330/08* (2013.01); *G09G 2330/12* (2013.01)

(58) Field of Classification Search
CPC ... G09G 2300/0852; G09G 2300/0861; G09G 2310/0264; G09G 2310/08; G09G 2300/0819; G09G 3/3233
See application file for complete search history.

(56) References Cited

FOREIGN PATENT DOCUMENTS

| | | |
|---|---|---|
| KR | 10-2016-0094130 A | 8/2016 |
| KR | 10-1837198 B1 | 3/2018 |
| KR | 10-2021-0086862 A | 7/2021 |

*Primary Examiner* — Abbas I Abdulselam
(74) *Attorney, Agent, or Firm* — Innovation Counsel LLP

(57) ABSTRACT

A display device includes a display panel including, a driving transistor configured to generate driving current, a light emitting element configured to emit light based on the driving current and an initialization transistor configured to apply an initialization voltage to an output electrode of the driving transistor, a sensing driver configured to generate sensing data by receiving the driving current of the pixels through initialization transistors and a driving controller configured to generate accumulated image data by accumulating input image data for frames and to compensate for the input image data based on the accumulated image data and the sensing data.

20 Claims, 10 Drawing Sheets

DISPLAY DEVICE AND METHOD OF DRIVING THE SAME

This application claims priority to Korean Patent Application No. 10-2022-0126238, filed on Oct. 4, 2022, and all the benefits accruing therefrom under 35 U.S.C. § 119, the content of which in its entirety is herein incorporated by reference.

BACKGROUND

1. Field

Embodiments of the present inventive concept relate to a display device and a method of driving the same. More particularly, embodiments of the present inventive concept relate to a display device and a method of driving the same compensating for a threshold voltage of a driving transistor, sensing a driving current, and compensating for mobility.

2. Description of the Related Art

Generally, a display device may include a display panel, a gate driver, a data driver, and a driving controller. The display panel may include gate lines, data lines, and pixels. The gate driver may provide the gate signals to gate lines, the data driver may provide data voltages to data lines, and the driving controller may control the gate driver and the data driver.

In the display device, differences in characteristics, such as a threshold voltage and mobility of a driving transistor, may occur for the pixels due to a process variation or the like. An internal compensation circuit may compensate for the threshold voltage of the driving transistor by controlling a voltage of a gate terminal of the driving transistor. However, the internal compensation circuit may not sense the driving current and may not compensate for the mobility of the driving transistor.

SUMMARY

Embodiments of the present inventive concept provide a display device compensating for a threshold voltage of a driving transistor, sensing a driving current, and compensating for mobility.

Embodiments of the present inventive concept provide a method of driving a display device compensating for a threshold voltage of a driving transistor, sensing a driving current, and compensating for mobility.

In an embodiment of a display device according to the present inventive concept, a display device includes a display panel including pixels, each of the pixels including a driving transistor configured to generate a driving current, a light emitting element connected between the driving transistor and a first power voltage line which is configured to provide a first power voltage, and configured to emit light based on the driving current, and an initialization transistor connected between an output electrode of the driving transistor and an initialization voltage line which is configured to provide an initialization voltage, a sensing driver connected to the initialization voltage line and configured to generate sensing data by receiving the driving current of the pixels through initialization transistors, and a driving controller connected to the sensing driver and configured to receive the sensing data from the sensing driver, and configured to generate accumulated image data by accumulating input image data for frames and to compensate for the input image data based on the accumulated image data and the sensing data.

In an embodiment, each of the pixels may further include a scan transistor connected between a data line and a gate electrode of the driving transistor, and configured to apply a data voltage to a gate electrode of the driving transistor, a compensation transistor connected between a reference voltage line which is configured to apply a reference voltage and the gate electrode of the driving transistor, a light emission control transistor connected between a second power voltage line which is configured to supply a second power voltage greater than the first power voltage and an input electrode of the driving transistor, a first capacitor including a first electrode connected to the gate electrode of the driving transistor and a second electrode connected to the output electrode of the driving transistor, and a second capacitor including a first electrode connected to the second power voltage line and a second electrode connected to the output electrode of the driving transistor.

In an embodiment, a non-emission sensing period during which the pixels are configured not to emit the light may include a first sensing period during which a threshold voltage of the driving transistor is compensated and a second sensing period during which the driving current is received and the sensing data is generated, and the first sensing period may include an initialization period during which a voltage of the gate electrode of the driving transistor and a voltage of the output terminal of the driving transistor are initialized, a threshold voltage compensation period during which the threshold voltage of the driving transistor is stored in the first capacitor, and a data writing period during which the data voltage is applied to the gate electrode of the driving transistor, and the second sensing period may include a mobility compensation period during which the sensing driver is configured to generate the sensing data by receiving the driving current through the initialization transistor.

In an embodiment, in the threshold voltage compensation period, the compensation transistor and the light emission control transistor may be turned on and the scan transistor and the initialization transistor may be turned off.

In an embodiment, in the threshold voltage compensation period, the compensation transistor may be configured to apply the reference voltage to the gate electrode of the driving transistor, and the voltage of the output electrode of the driving transistor is changed to a voltage subtracting the threshold voltage of the driving transistor from the reference voltage. In an embodiment, in the mobility compensation period, the initialization transistor and the light emission control transistor may be turned on and the scan transistor and the compensation transistor may be turned off.

In an embodiment, in the mobility compensation period, the first power voltage may become equal to the second power voltage.

In an embodiment, in the mobility compensation period, the driving current may flow through the initialization transistor.

In an embodiment, in the first sensing period, the initialization voltage may be applied to the initialization voltage line, the sensing driver may include an integrator and an analog-to-digital converter connected to the integrator, in the second sensing period, the integrator may be connected to the initialization voltage line and configured to receive the driving current of the pixels and to output an output voltage, and the analog-to-digital converter may be configured to generate the sensing data corresponding to the output voltage.

In an embodiment, in the second sensing period, an input electrode of the integrator may be connected to the initialization voltage line.

In an embodiment, the integrator may be configured to be connected to the initialization voltage line in the second sensing period and may be configured not to be connected to the initialization voltage line in the first sensing period.

In an embodiment, the sensing driver may further include a first switch configured to selectively apply the initialization voltage to the initialization voltage line in the first sensing period.

In an embodiment, the sensing driver may further include a second switch connected between the initialization voltage line and the integrator, and configured to selectively connect the integrator to the initialization voltage line in the second sensing period.

In an embodiment, in the initialization period, the compensation transistor and the initialization transistor may be turned on and the scan transistor and the light emission control transistor may be turned off.

In an embodiment, in the initialization period, the gate electrode of the driving transistor is configured to be connected to the reference voltage line and the output electrode of the driving transistor is configured to be connected to the initialization voltage line.

In an embodiment, in the data writing period, the scan transistor may be turned on, and the compensation transistor, the initialization transistor, and the light emission control transistor may be turned off.

In an embodiment, in the data writing period, the gate electrode of the driving transistor may be configured to receive the data voltage.

In an embodiment, the driving transistor may be turned on when the scan transistor may be turned on.

In an embodiment of a method of driving a display device according to the present inventive concept, the method includes initializing a voltage of a gate electrode and a voltage of an output electrode of a driving transistor, storing a threshold voltage of the driving transistor in a first capacitor, applying a data voltage to a gate electrode of the driving transistor, generating sensing data by receiving a driving current of the driving transistor of a pixel through an initialization transistor, and generating accumulated image data by accumulating input image data for frames to compensate for the input image data based on the accumulated image data and the sensing data.

In an embodiment, the pixel may include the driving transistor configured to generate the driving current, a scan transistor configured to apply the data voltage to the gate electrode of the driving transistor, a compensation transistor configured to apply a reference voltage to the gate electrode of the driving transistor, an initialization transistor configured to apply an initialization voltage to the output electrode of the driving transistor, a light emission control transistor configured to apply a first power voltage to generate the driving current, the first capacitor including a first electrode connected to the gate electrode of the driving transistor and a second electrode connected to the output electrode of the driving transistor, and a second capacitor including a first electrode configured to receive the first power voltage and a second electrode connected to the output electrode of the driving transistor.

A display device and a method of driving the display device according to embodiments of the present inventive concept may compensate for a threshold voltage of a driving transistor by using an internal compensation circuit, allow the driving current to flow through an initialization transistor and enhance display quality by sensing a driving current of the driving transistor and compensating for mobility.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION

Hereinafter, embodiments of the present inventive concept will be described in detail with reference to the accompanying drawings.

Figure 1:
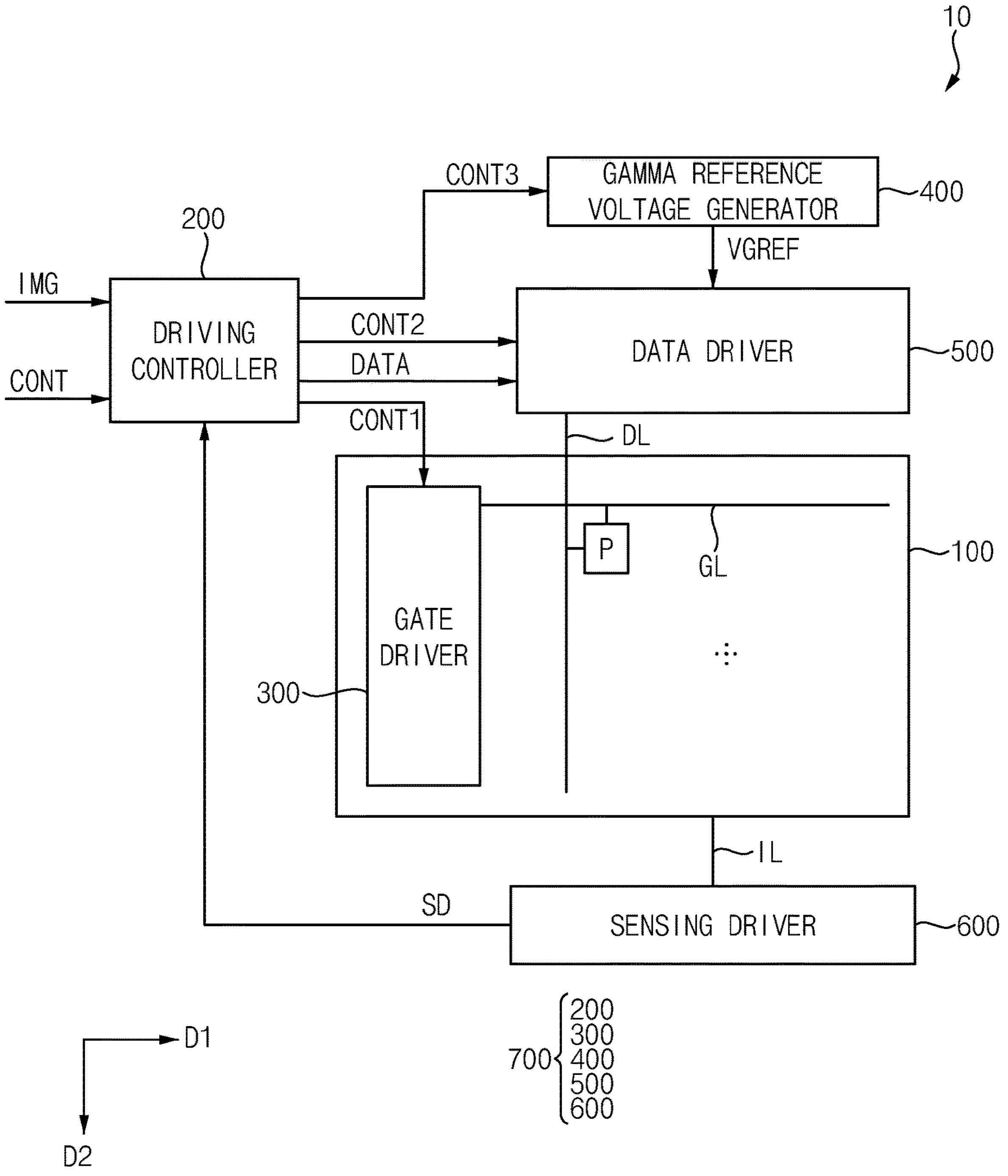
FIG. 1 is a block diagram illustrating a display device according to embodiments.

FIG. 1 is a block diagram illustrating a display device according to embodiments.

Referring to FIG. 1, the display device 10 may include a display panel 100 and a display panel driver 700. The display panel driver 700 may include a driving controller 200, a gate driver 300, a gamma reference voltage generator 400, a data driver 500, and a sensing driver 600. The display panel driver may further include a power voltage generator (not shown).

For example, the driving controller 200 and the data driver 500 may be integrally formed. For example, the driving controller 200, the gamma reference voltage generator 400, and the data driver 500 may be integrally formed. For example, the driving controller 200, the gamma reference voltage generator 400, the data driver 500, and the sensing driver 600 may be integrally formed. A driving module including at least the driving controller 200 and the data driver 500 which are integrally formed may be referred to as a timing controller embedded data driver (TED).

The display panel 100 may include a display region displaying an image and a peripheral region surrounding the display region.

For example, the display panel 100 may be an organic light emitting diode display panel including organic light emitting diodes. For example, the display panel 100 may be a quantum-dot organic light emitting diode display panel including organic light emitting diodes and quantum-dot color filters. For example, the display panel 100 may be a quantum-dot nano light emitting diode display panel including nano light emitting diodes and quantum-dot color filters.

The display panel 100 includes gate lines GL, data lines DL, and pixels P electrically connected to the gate lines GL and the data lines DL. The gate lines GL may extend in a first direction D1 and the data lines DL may extend in a second direction D2 crossing the first direction D1.

The display panel 100 may further include initialization voltage lines IL connected to the pixels P. The initialization voltage lines IL may extend in the second direction D2.

The driving controller 200 may receive input image data IMG and an input control signal CONT from an external device (not shown). For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generates the data signal DATA based on the input image data IMG. The driving controller 200 may output the data signal DATA to the data driver 500.

The driving controller 200 may generate the third control signal CONT3 for controlling an operation of a gamma reference voltage generator 400 based on the input control signal CONT, and output the third control signal CONT3 to the gamma reference voltage generator 400.

The gate driver 300 may generate gate signals driving the gate lines GL in response to the first control signal CONT1 received from the driving controller 200. The gate driver 300 may output the gate signals to the gate lines GL. For example, the gate driver 300 may sequentially output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be embedded in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into the analog data voltage using the gamma reference voltage VGREF. The data driver 500 may output the data voltage to the data lines DL.

The sensing driver 600 may receive driving current from the pixels P of the display panel 100 through the initialization voltage line IL. The sensing driver 600 may generate sensing data SD corresponding to the driving current and output the sensing data SD to the driving controller 200. The driving controller 200 may compensate for the input image data IMG based on the sensing data SD. Meanwhile, as shown in FIG. 1, the sensing driver 600 may be implemented as a separate integrated circuit, but is not limited thereto. For example, the sensing driver 600 may be embedded in the data driver 500. A detailed description of this will be given later.

Figure 2:
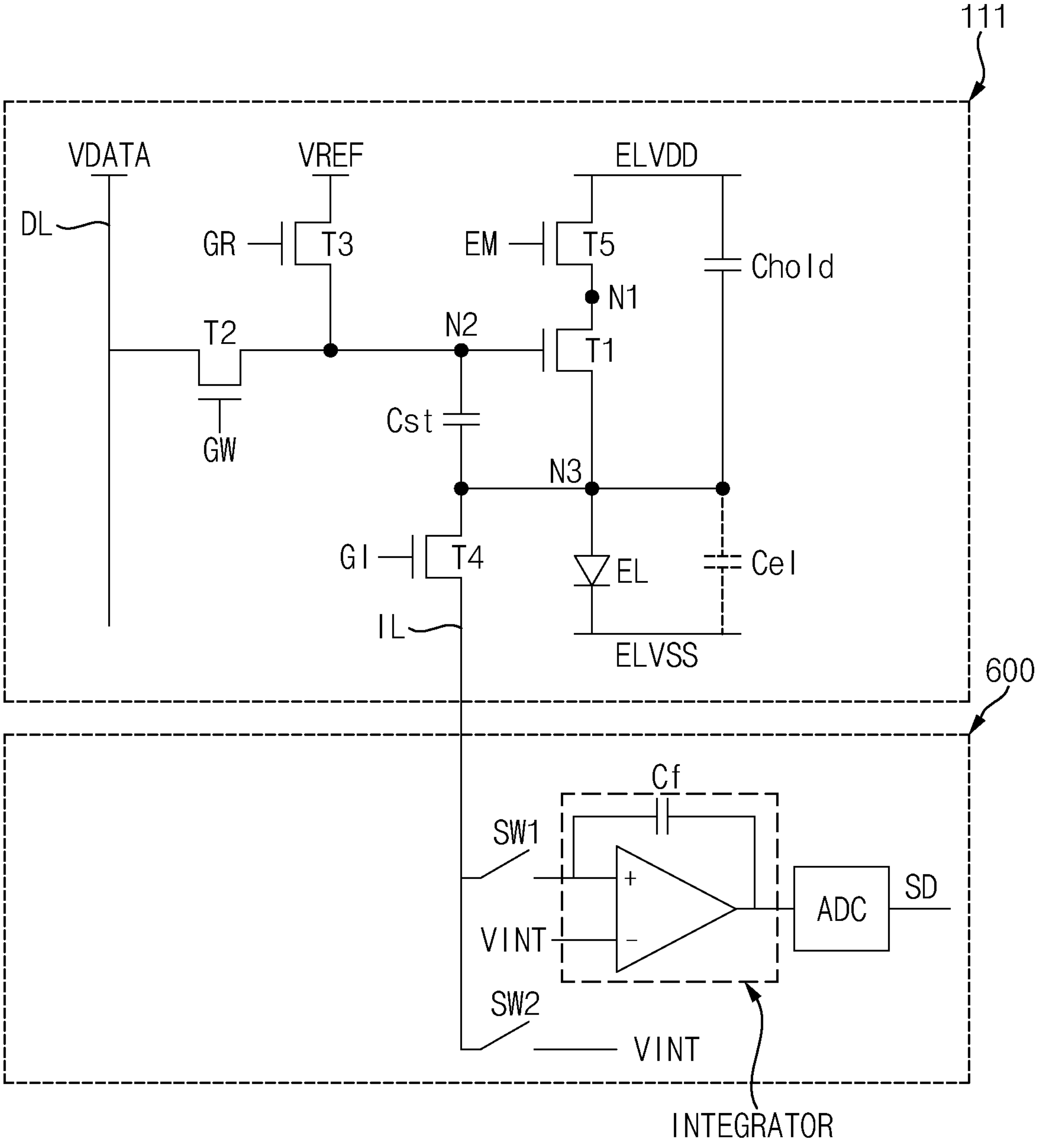
FIG. 2 is a block diagram illustrating an embodiment of an internal compensation circuit of a pixel of FIG. 1 and an embodiment of a sensing driver of FIG. 1.
Figure 3:
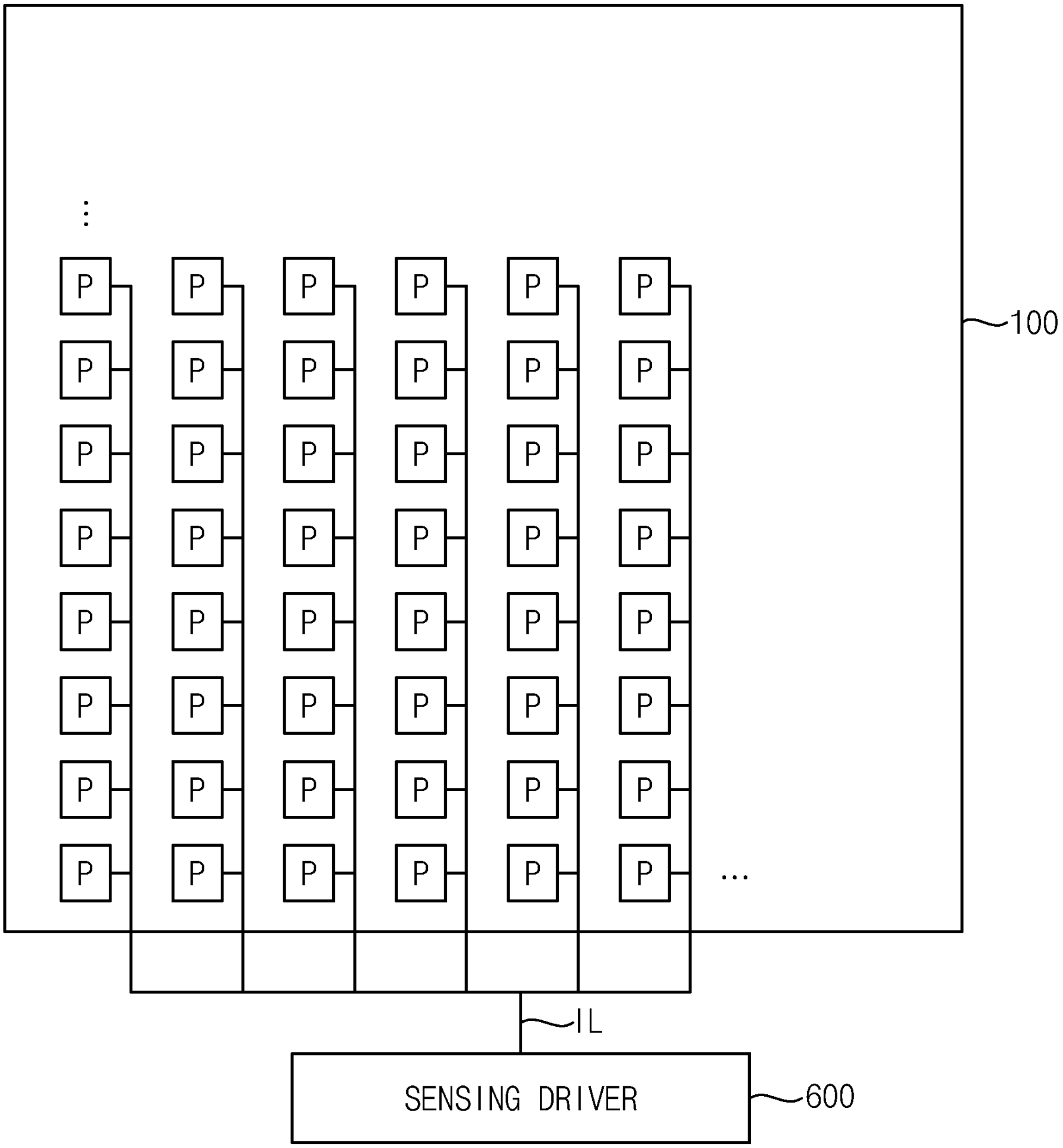
FIG. 3 is a diagram illustrating an embodiment of a display panel of FIG. 1 and an embodiment of the sensing driver of FIG. 1.

FIG. 2 is a block diagram illustrating an embodiment of an internal compensation circuit of a pixel of FIG. 1 and an embodiment of a sensing driver of FIG. 1. FIG. 3 is a diagram illustrating an embodiment of a display panel of FIG. 1 and an embodiment of the sensing driver of FIG. 1.

Referring to FIGS. 1 and 2, the pixel circuit 111 may include the driving transistor T1, a scan transistor T2, a compensation transistor T3, an initialization transistor T4, an light emission control transistor T5, a first capacitor Cst, a second capacitor Chold, and a light emitting element EL. The pixel circuit 111 may further include a third capacitor Cel as a parasitic capacitor.

The driving transistor T1 may include an input electrode connected to a first node N1, a gate electrode connected to a second node N2, and an output electrode connected to a third node N3. The driving current flowing to the light emitting element EL may be generated according to a voltage of the gate electrode (i.e., the second node N2) of the driving transistor T1.

The scan transistor T2 may include an input electrode connected to the data line DL, a gate electrode receiving a first gate signal GW, and an output electrode connected to the second node N2. When the scan transistor T2 is turned on in response to the first gate signal GW, the data voltage VDATA supplied from the data line DL may be applied to the gate electrode (i.e., the second node N2) of the driving transistor T1.

The compensation transistor T3 may include an input electrode receiving a reference voltage VREF, a gate electrode receiving a second gate signal GR, and an output electrode connected to the gate electrode (i.e., the second node N2) of the driving transistor T1. When the compensation transistor T3 is turned on in response to the second gate signal GR, the reference voltage VREF may be applied to the gate electrode (i.e., the second node N2) of the driving transistor T1.

The initialization transistor T4 may include an input electrode connected to the output electrode (i.e., the third node N3) of the driving transistor T1, a gate electrode receiving a third gate signal GI, and an output electrode connected to the initialization voltage line IL to receive a initialization voltage VINT. When the initialization transistor T4 is turned on in response to the third gate signal GI, the initialization voltage VINT may be applied to the output terminal (i.e., the third node N3) of the driving transistor T1.

The initialization transistor T4 may be connected to the sensing driver 600 through the initialization voltage line IL. The initialization transistor T4 may apply the initialization voltage VINT to the output terminal (i.e., the third node N3) of the driving transistor T1. The driving current of the driving transistor T1 may flow to the sensing driver 600 through the initialization transistor T4 and the initialization voltage line IL.

The sensing driver 600 may generate the sensing data SD and supply the sensing data SD to the driving controller 200.

The sensing driver 600 may include an integrator and an analog-to-digital converter ADC. The integrator may be connected to the pixels P through the initialization voltage line IL, receive the driving current of the driving transistors T1 of the pixels P through the initialization voltage line IL, and output an output voltage. For example, the integrator may receive the driving current of the driving transistor T1 of the pixels P through the initialization voltage lines IL and output the output voltage to the analog-to-digital converter ADC. In an embodiment, an input electrode of the integrator (e.g., a negative electrode of the integrator of FIG. 2) may receive the initialization voltage VINT. In an embodiment, the integrator may be connected to the initialization voltage line IL in a second sensing period SP2 and may not be connected to the initialization voltage line IL in a first sensing period SP1. The analog-to-digital converter ADC may generate the sensing data SD (i.e., a sensing operation) corresponding to the output voltage supplied from the integrator. A detailed description of this will be given later.

The light emission control transistor T5 may include an input electrode receiving a first power voltage ELVDD, a gate electrode receiving a fourth gate signal EM, and an output electrode connected to the input electrode (i.e., the first node N1) of the driving transistor T1. The light emitting control transistor T5 may determine whether the driving current is generated. For example, when the light emitting control transistor T5 is turned on in response to the fourth gate signal EM, the light emitting element EL may emit light by the driving current flowing through the driving transistor T1 between the first power voltage ELVDD and a second power voltage ELVSS.

The light emitting element EL may include an anode electrode connected to the third node N3 and a cathode electrode receiving the second power voltage ELVSS.

The light emitting element EL may emit the light based on the driving current generated by the driving transistor T1. In an embodiment, the light emitting element EL may be an organic light emitting diode OLED, but is not limited thereto. In an embodiment, the light emitting element EL may be any suitable light emitting element. For example, the light emitting element EL may be a nano light emitting diode NED, a quantum dot QD light emitting diode, a micro light emitting diode, an inorganic light emitting diode, or any other suitable light emitting element. In an embodiment, the light emitting element EL may include the parasitic capacitor Cel between the anode of the light emitting element EL and a second power voltage line which provides the second power voltage ELVSS.

The first capacitor Cst (e.g., a storage capacitor) may includes a first electrode connected to the gate electrode (i.e., the second node N2) of the driving transistor T1 and a second electrode connected to the output electrode (i.e., the third node N3) of the driving transistor T1. The first capacitor Cst may store the data voltage VDATA applied from the data line DL.

The second capacitor Chold may include a first electrode receiving the first power voltage ELVDD and a second electrode connected to the output electrode (i.e., the third node N3) of the driving transistor T1. The second capacitor Chold may a holding capacitor for maintaining a voltage of the output electrode (i.e., the third node N3) of the driving transistor T1. In an embodiment, the second capacitor Chold may be a parasitic capacitor between a first power voltage line which provides the first power voltage ELVDD and the output electrode of the driving transistor T1, but is not limited thereto.

Referring to FIG. 3, the sensing driver 600 may be connected to the initialization transistors T4 in the pixels P through the initialization voltage lines IL and receive the driving currents of the pixels P through the initialization voltage lines IL.

Figure 4:
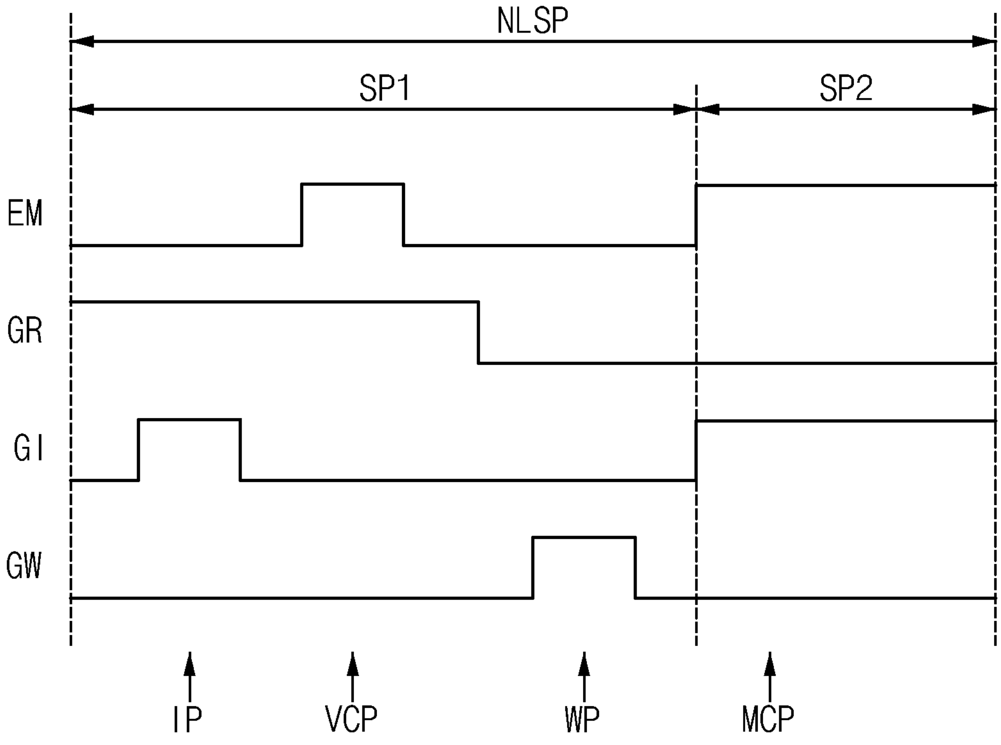
FIG. 4 is a timing diagram illustrating the pixel and an operation of the sensing driver of FIG. 2.
Figure 5:
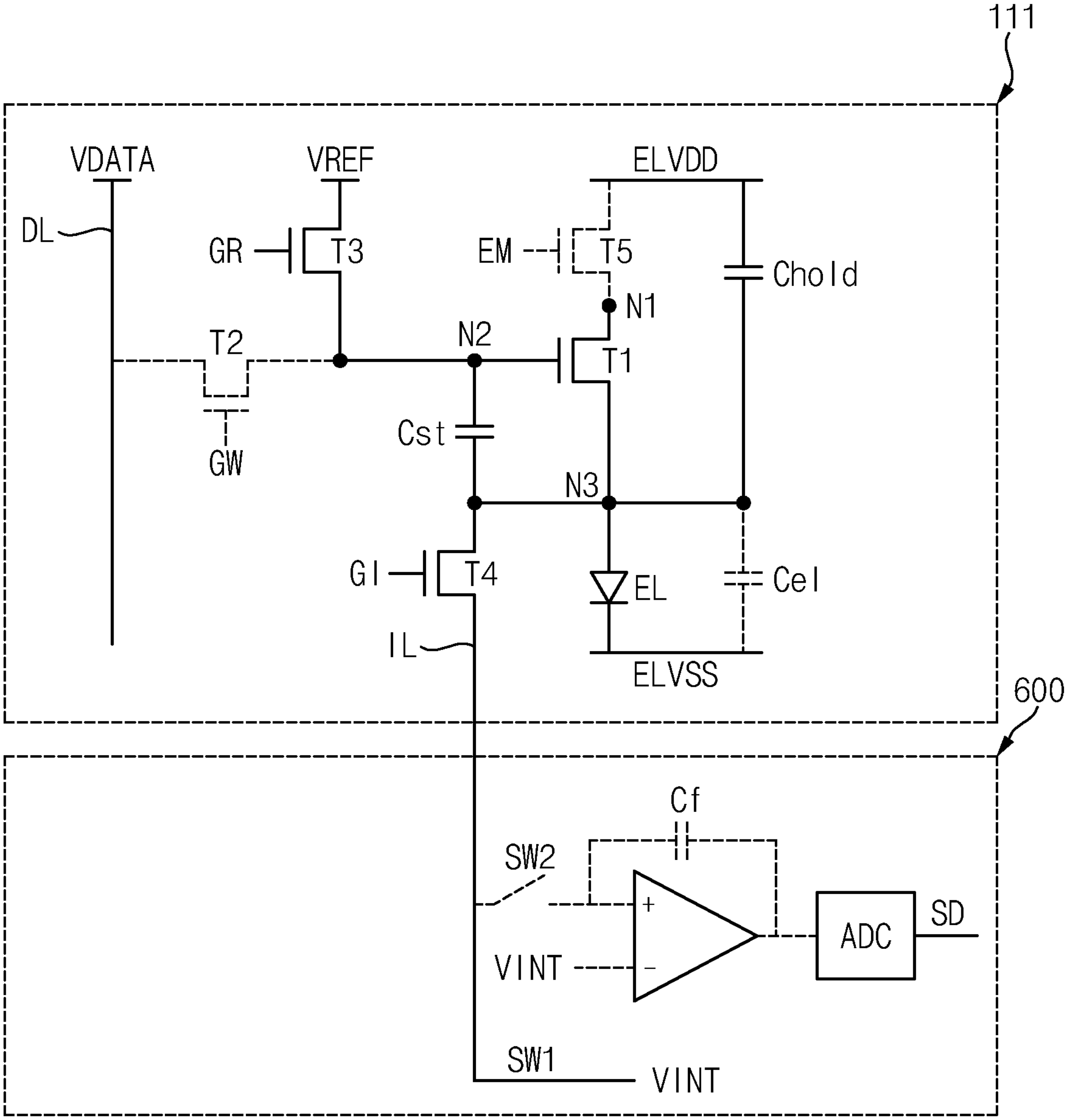
FIG. 5 is a circuit diagram illustrating the pixel of FIG. 3 and the operation of the sensing driver of FIG. 3 in an initialization period of FIG. 4.
Figure 6:
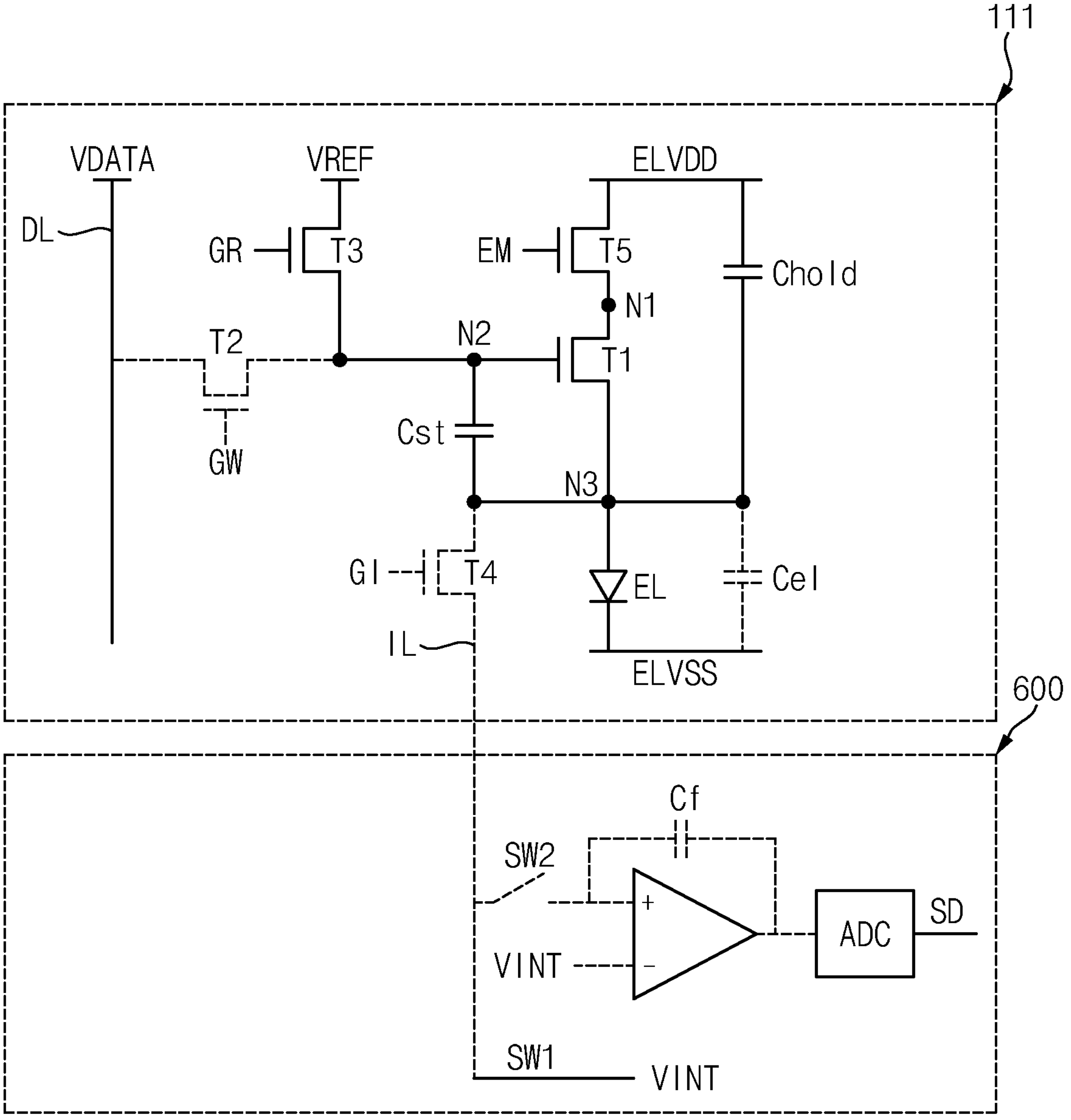
FIG. 6 is a circuit diagram illustrating the pixel of FIG. 3 and the operation of the sensing driver of FIG. 3 in a threshold voltage compensation period of FIG. 4.
Figure 7:
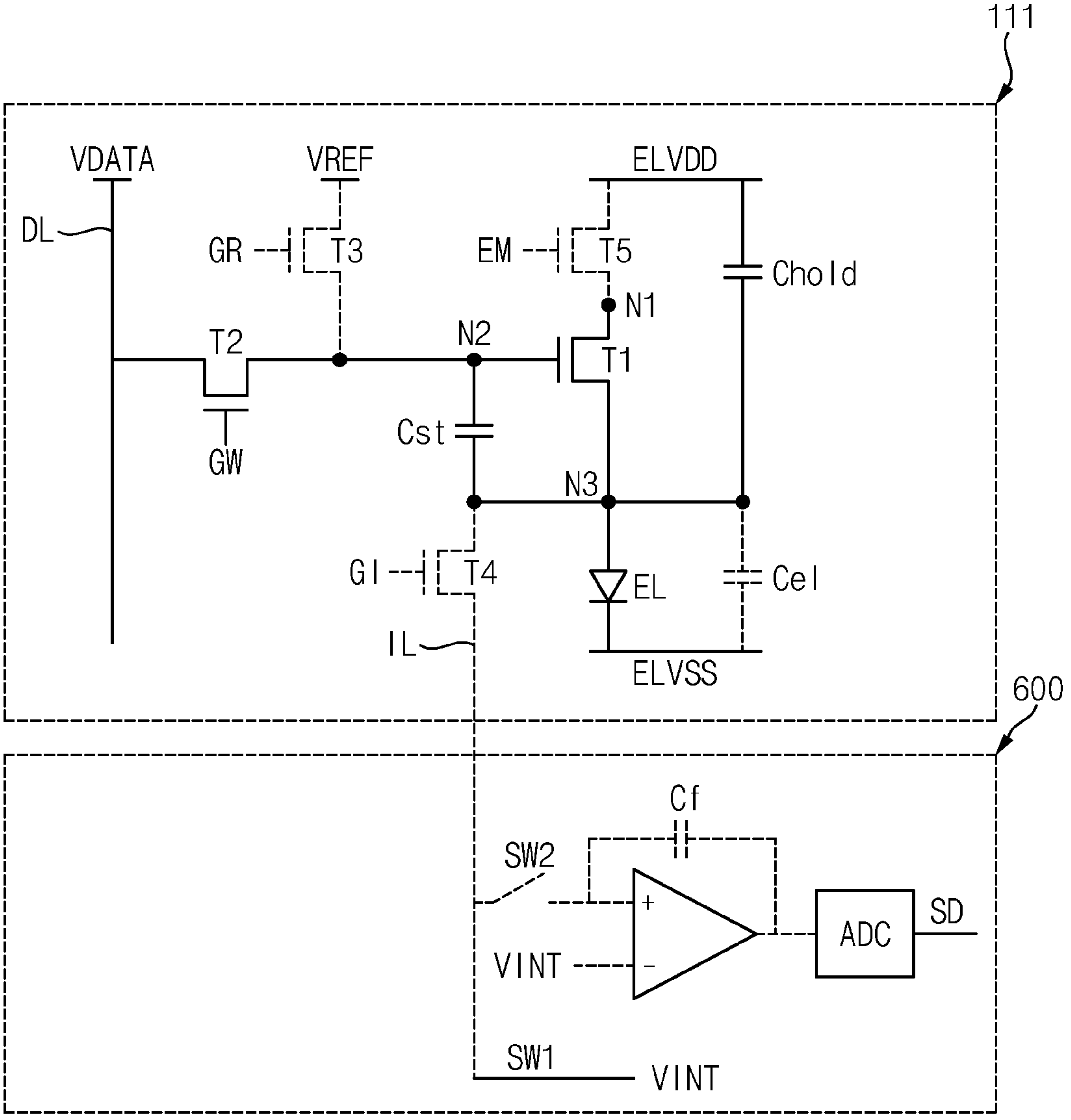
FIG. 7 is a circuit diagram illustrating the pixel of FIG. 3 and the operation of the sensing driver of FIG. 3 in a data writing period of FIG. 4.
Figure 8:
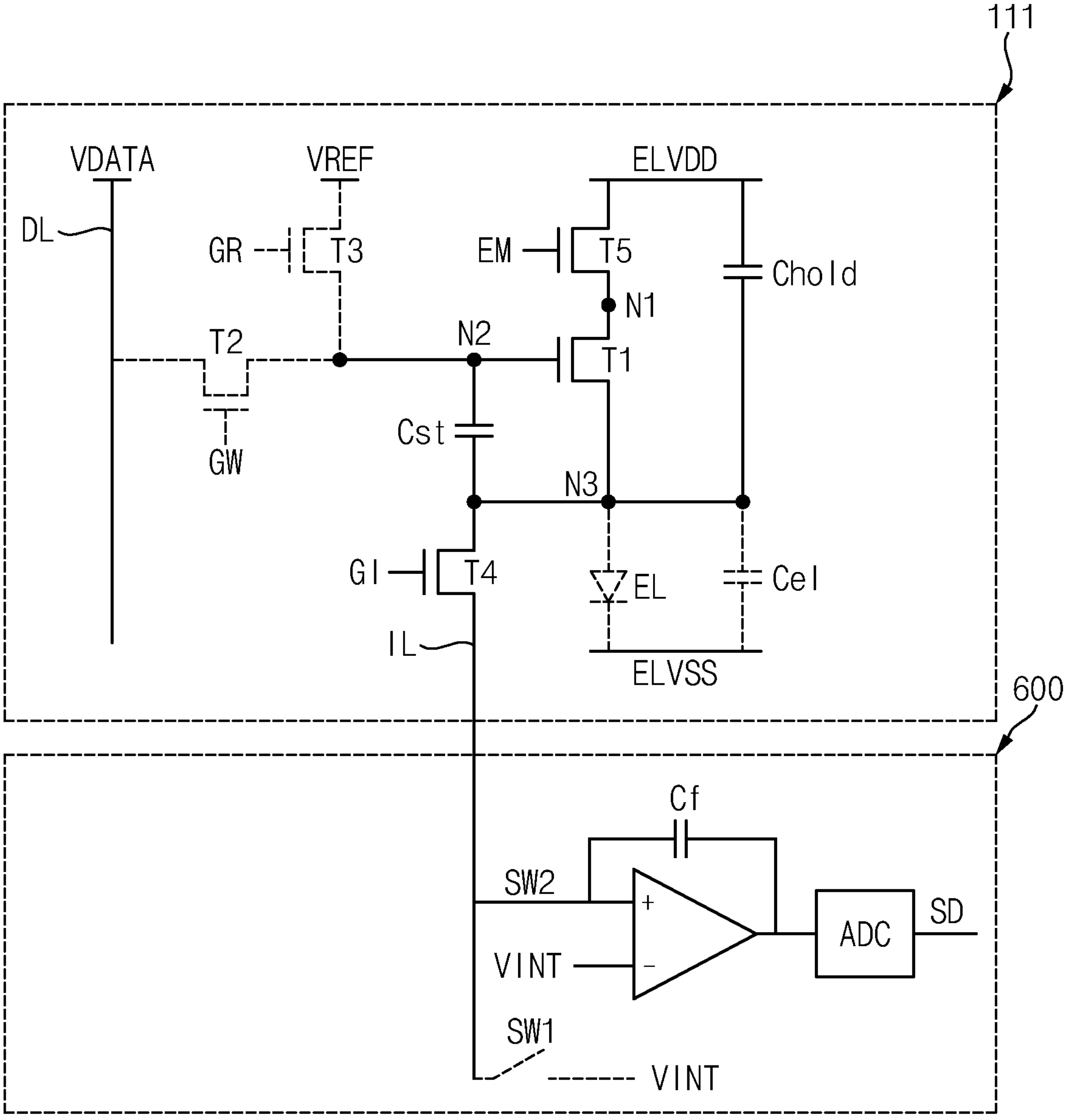
FIG. 8 is a circuit diagram illustrating the pixel of FIG. 3 and the operation of the sensing driver of FIG. 3 in a mobility compensation period of FIG. 4.

FIG. 4 is a timing diagram illustrating an operation of the pixel and the sensing driver of FIG. 2. FIG. 5 is a circuit diagram illustrating the pixel of FIG. 3 and the operation of the sensing driver of FIG. 3 in an initialization period of FIG. 4. FIG. 6 is a circuit diagram illustrating the pixel of FIG. 3 and the operation of the sensing driver of FIG. 3 in a threshold voltage compensation period of FIG. 4. FIG. 7 is a circuit diagram illustrating the pixel of FIG. 3 and the operation of the sensing driver of FIG. 3 in a data writing period of FIG. 4. FIG. 8 is a circuit diagram illustrating the pixel of FIG. 3 and the operation of the sensing driver of FIG. 3 in a mobility compensation period of FIG. 4.

Referring to FIG. 4, a non-emission sensing period NLSP in which the pixels P do not emit the light may include the first sensing period SP1 compensating for the threshold voltage of the driving transistor T1 and the second period SP2 receiving the driving current and generating the sensing data SD. A threshold voltage compensation of the driving transistor T1 may be performed in the first sensing period SP1, and the driving current of the driving transistor T1 may be sensed and mobility compensation may be performed in the second sensing period SP2. The first sensing period SP1 may include an initialization period IP in which the voltage of the gate electrode (i.e., the second node N2) of the driving transistor T1 and a voltage of the output electrode (i.e., the third node N3) of the driving transistor T1 are initialized, a threshold voltage compensation period VCP in which the threshold voltage of the driving transistor T1 is stored in the first capacitor Cst, and a data writing period WP in which the data voltage VDATA is applied to the gate electrode (i.e., the second node N2) of the driving transistor T1. The second sensing period SP2 may include a mobility compensation period MCP in which the sensing driver 600 may receive the driving current of the driving transistor T1 of the pixels P and generate the sensing data SD.

In the initialization period IP, the second gate signal GR and the third gate signal GI may have an active level (e.g., a high level), and the first gate signal GW and the fourth gate signal EM may have an inactive level (e.g., a low level). The compensation transistor T3 and the initialization transistor T4 may be turned on, and the scan transistor T2 and the light emission control transistor T5 may be turned off. As shown in FIG. 5, the compensation transistor T3 may be turned on in response to the second gate signal GR having the active level, and the gate electrode (i.e., the second node N2) of the driving transistor T1 may receive the reference voltage VREF, and the initialization transistor T4 is turned on in response to the third gate signal GI having the active level, so that the output electrode (i.e., the third node N3) of the driving transistor T1 may receive the initialization voltage VINT. Accordingly, the voltage of the gate terminal (i.e., the second node N2) of the driving transistor T1 may be initialized to the reference voltage VREF, and the voltage of the output terminal (i.e., the third node N3) of the driving transistor T1 may be initialized as the initialization voltage VINT.

In the threshold voltage compensation period VCP, the second gate signal GR and the fourth gate signal EM may have active level, and the first gate signal GW and the third gate signal GI may have inactive level. The compensation transistor T3 and the light emission control transistor T5 may be turned on, and the scan transistor T2 and the initialization transistor T4 may be turned off. As shown in FIG. 6, the compensation transistor T3 may be turned on in response to the second gate signal GR having the active level and apply the reference voltage VREF to the gate electrode (i.e., the second node N2) of the driving transistor T1, and the light emission control transistor T5 may be turned on in response to the fourth gate signal EM having the active level. The input electrode of the driving transistor T1 may receive the first power supply voltage ELVDD. The compensation transistor T3 may apply the reference voltage VREF to the gate electrode of the driving transistor T1, and the voltage of the output electrode (i.e., the third node N3) of the driving transistor T1 may have a voltage subtracting the threshold voltage of the driving transistor T1 from the reference voltage VREF. The driving transistor T1 may operate as a source follower. The threshold voltage of the driving transistor T1 may be stored in the first capacitor Cst. Accordingly, the threshold voltage of the driving transistor T1 may be compensated.

In the data writing period WP, the first gate signal GW may have the active level, and the second gate signal GR, the third gate signal GI, and the fourth gate signal EM may have the inactive level. The scan transistor T2 may be turned on, and the compensation transistor T3, initialization transistor T4, and emission control transistor T5 may be turned off. When the scan transistor T2 is turned on, the driving transistor T1 may be turned on. As shown in FIG. 7, the scan transistor T2 may be turned on in response to the first gate signal GW having the active level, and the gate electrode (i.e., the second node N2) of the driving transistor T1 may receive the data voltage VDATA.

However, the voltage of the second node N2, that is, the voltage of the first electrode of the first capacitor Cst may be changed from the reference voltage VREF to the data voltage VDATA by "$\Delta$(VDATA−VREF)". When the voltage of the second node N2 is changed by "$\Delta$(VDATA−VREF)", the voltage of the third node N3, that is, the voltage of the second electrode of the first capacitor Cst may be changed by "$C_{ratio}$*(VDATA−VREF)" based on the voltage of the second node N2.

$C_{ratio}$ may be determined based on the first capacitor Cst, the second capacitor Chold, and the third capacitor Cel connected to the third node N3.

In the mobility compensation period MCP, the third gate signal GI and the fourth gate signal EM may have active level, and the first gate signal GW and the second gate signal GR may have inactive level. The initialization transistor T4 and the light emission control transistor T5 may be turned on, and the scan transistor T2 and the compensation transistor T3 may be turned off. As shown in FIG. 8, for example, the first power voltage ELVDD may be applied to the input electrode of the driving transistor T1, and the driving current corresponding to a gate-source voltage of the driving transistor T1 (i.e., a voltage between the gate electrode of the driving transistor T1 and the output electrode of the driving transistor T1) may be generated.

In the mobility compensation period MCP, the second power voltage ELVSS may become equal to the first power voltage ELVDD. Accordingly, the driving current may flow through the initialization transistor T4 and may not flow to the light emitting element EL. The driving current may flow to the sensing driver 600 through the initialization transistor T4 and the initialization voltage line IL and may not flow to the light emitting element EL so that the light emitting element EL may not emit the light.

In the first sensing period SP1, the initialization voltage VINT may be applied to the initialization voltage line IL. In the second sensing period SP2 (i.e., the sensing period MCP), the integrator may receive the driving current of the pixels P and output the output voltage, and the analog-to-digital converter ADC may generate the sensing data SD corresponding to the output voltage.

The integrator may be connected to the initialization voltage line IL in the second sensing period SP2 (i.e., the mobility compensation period MCP) and may not be connected to the initialization voltage line IL in the first sensing period SP1. The sensing driver 600 may further include a first switch SW1 which selectively applies the initialization voltage VINT to the initialization voltage line IL in the first sensing period SP1. The sensing driver 600 may further include a second switch SW2 which selectively connects the integrator to the initialization voltage line IL in the second sensing period SP2. In the first sensing period SP1, the first switch SW1 may be turned on and the second switch SW2 may be turned off. In the second sensing period SP2, the first switch SW1 may be turned off and the second switch SW2 may be turned on.

In the second sensing period SP2 (i.e., the mobility compensation period MCP), the input electrode of the integrator may receive a driving current. Since the second power voltage ELVSS connected to the cathode of the light emitting element EL maintains the first power voltage ELVDD during the second sensing period SP2P2 (i.e., the mobility compensation period MCP), the driving current may not flow through the light emitting element EL but flows to the sensing driver 600 through the initialization transistor T4 and the second switch SW2.

The sensing driver 600 may receive the driving current and generate the sensing data SD corresponding to the driving current received through the initialization voltage line IL. The sensing driver 600 may generate the sensing data SD and output the sensing data SD to the driving controller 200.

The driving controller 200 may compensate for the input image data IMG based on the sensing data SD to compensate for the mobility of the driving transistor T1.

In order to compensate for the mobility of the driving transistor T1, the driving controller 200 may accumulate the input image data IMG for frames to generate accumulated image data, and compensate for the input image data IMG based on the accumulated image data and the sensing data SD. Here, large amount of accumulated data may mean that the light emitting element EL of the pixels P emits a lot of light, and the light emitting element EL may be in a state in which deterioration has progressed a lot.

The driving controller 200 may generate the compensated data signal DATA using the compensated input image data IMG. The driving controller 200 may output the compensated data signal DATA to the data driver 500. The data driver 500 may convert the compensated data signal DATA into the compensated data voltage VDATA and apply the converted data voltage VDATA to the pixels P.

As such, the display device 10 may compensate for the threshold voltage of the driving transistor T1 by using an internal compensation circuit and sensing the driving current of the driving transistor T1 and compensating for mobility by allowing the driving current to flow through the initialization transistor T4, so that display quality may be enhanced.

Figure 9:
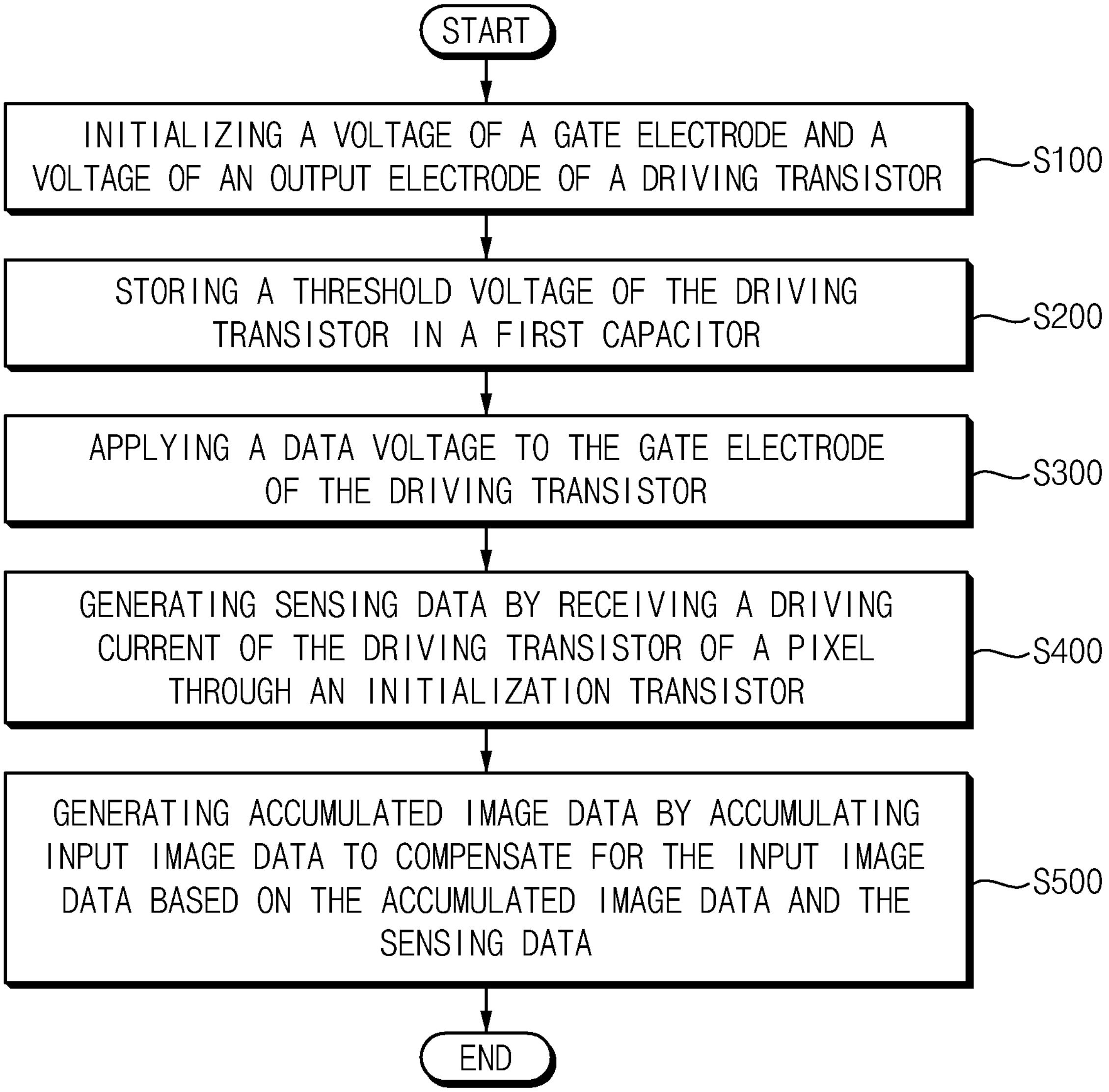
FIG. 9 is a flowchart illustrating a method of driving the display device according to embodiments.

FIG. 9 is a flowchart illustrating a method of driving the display device according to embodiments.

Referring to FIGS. 1 to 9, the method of driving the display device 10 may include initializing the voltage of the gate electrode (i.e., the second node N2) and the voltage of the output electrode (i.e., the third node N3) of the driving transistor T1 (S100), storing the threshold voltage of the driving transistor T1 in the first capacitor Cst (S200), applying the data voltage VDATA to the gate electrode (i.e., the second node N2) of the driving transistor T1 (S300), generating the sensing data SD by receiving the driving current of the driving transistor T1 of the pixel P through the initialization transistor T4 (S400) and generating the accumulated image data by accumulating the input image data IMG for frames, and compensating for the input image data IMG based on the accumulated image data and the sensing data SD (S500). The method of driving the display device 10 of FIG. 9 may be substantially equal to the display device 10 described with reference to FIGS. 1 to 8. Therefore, redundant descriptions of the same or corresponding components will be omitted.

In an embodiment, the pixel P may include the driving transistor T1 generating the driving current, the scan transistor T2 applying the data voltage VDATA to the gate electrode of the driving transistor T1, the compensation transistor T3 applying the reference voltage VREF to the gate electrode of the driving transistor T1, the initialization transistor T4 applying the initialization voltage VINT to the output electrode of the driving transistor T1, the light emission control transistor T5 determining whether to generate the driving current, the first capacitor Cst including the first electrode connected to the gate electrode of the driving transistor T1 and the second electrode connected to the output electrode of the driving transistor T1, and the second capacitor Chold including the first electrode receiving the first power voltage ELVDD and the second electrode connected to the output electrode of the driving transistor T1.

As such, the method of driving the display device 10 may compensate for the threshold voltage of the driving transistor T1 by using an internal compensation circuit and sensing the driving current of the driving transistor T1 and compensating for mobility by allowing the driving current to flow through the initialization transistor T4, so that display quality may be enhanced.

Figure 10:
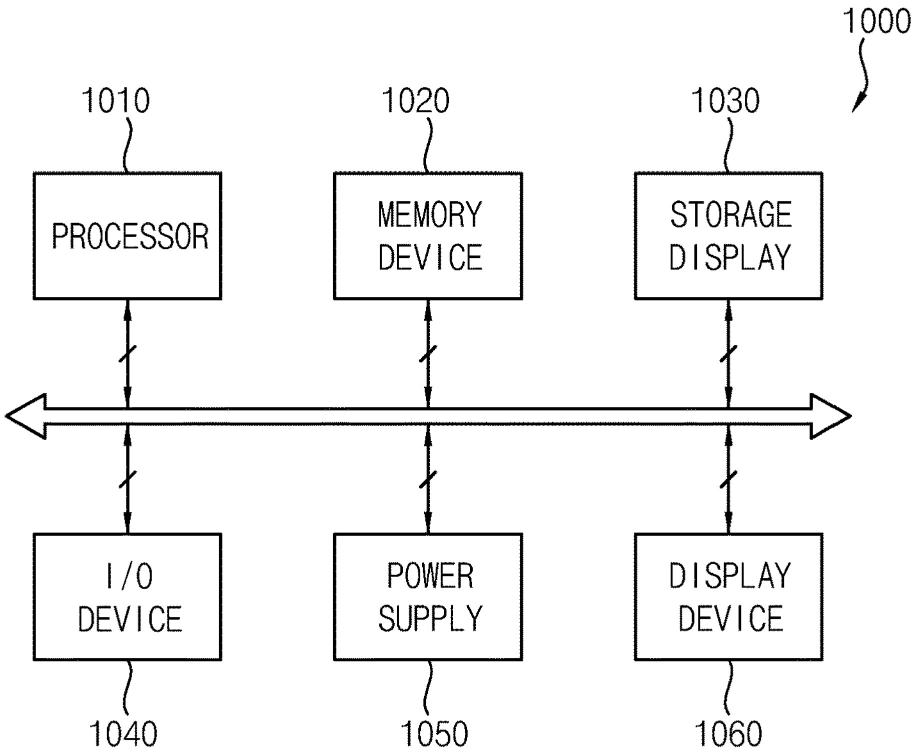
FIG. 10 is a block diagram illustrating an electronic device according to embodiments.
Figure 11:
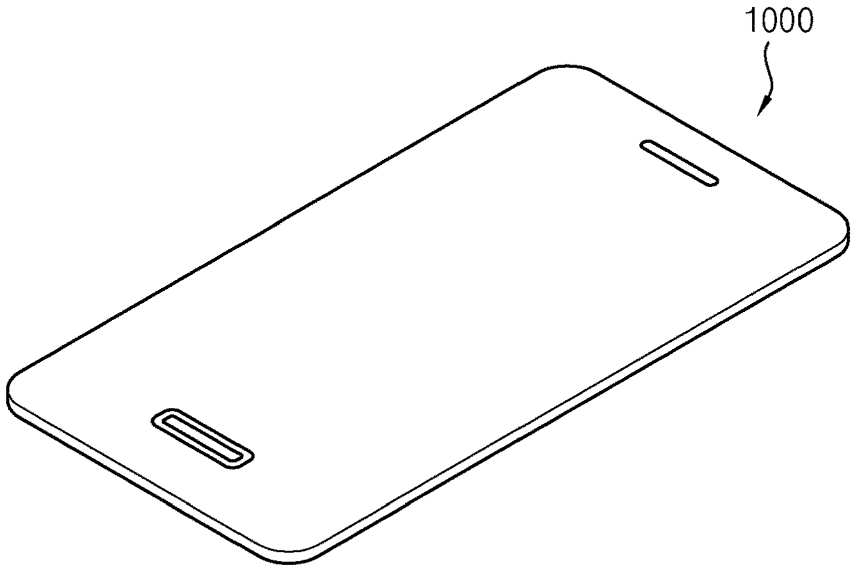
FIG. 11 is a diagram illustrating an embodiment in which the electronic device of FIG. 10 is implemented as a smart phone.

FIG. 10 is a block diagram illustrating an electronic device according to embodiments. FIG. 11 is a diagram illustrating an embodiment in which the electronic device of FIG. 10 is implemented as a smart phone.

Referring to FIGS. 10 and 11, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 11, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060. The power supply 1050 may provide power for operations of the electronic device 1000.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including pixels, each of the pixels including:

a driving transistor configured to generate a driving current, a light emitting element connected between the driving transistor and a first power voltage line which is configured to provide a first power voltage, and configured to emit light based on the driving current, and an initialization transistor connected between an output electrode of the driving transistor and an initialization voltage line which is configured to provide an initialization voltage;

a sensing driver connected to the initialization voltage line and configured to generate sensing data by receiving the driving current of the pixels through initialization transistors; and a driving controller connected to the sensing driver and configured to receive the sensing data from the sensing driver, and configured to generate accumulated image data by accumulating input image data for frames and to compensate for the input image data based on the accumulated image data and the sensing data.

2. The display device of claim 1, wherein each of the pixels further includes:

a scan transistor connected between a data line and a gate electrode of the driving transistor, and configured to apply a data voltage to a gate electrode of the driving transistor;

a compensation transistor connected between a reference voltage line which is configured to apply a reference voltage and the gate electrode of the driving transistor;

a light emission control transistor connected between a second power voltage line which is configured to supply a second power voltage greater than the first power voltage and an input electrode of the driving transistor;

a first capacitor including a first electrode connected to the gate electrode of the driving transistor and a second electrode connected to the output electrode of the driving transistor; and a second capacitor including a first electrode connected to the second power voltage line and a second electrode connected to the output electrode of the driving transistor.

3. The display device of claim 2, wherein the driving transistor is turned on when the scan transistor is turned on.

4. The display device of claim 2, wherein a non-emission sensing period during which the pixels are configured not to emit the light includes a first sensing period during which a threshold voltage of the driving transistor is compensated and a second sensing period during which the driving current is received and the sensing data is generated, and wherein the first sensing period includes:

an initialization period during which a voltage of the gate electrode of the driving transistor and a voltage of the output terminal of the driving transistor are initialized, a threshold voltage compensation period during which the threshold voltage of the driving transistor is stored in the first capacitor, and a data writing period during which the data voltage is applied to the gate electrode of the driving transistor, and wherein the second sensing period includes a mobility compensation period during which the sensing driver is configured to generate the sensing data by receiving the driving current through the initialization transistor.

5. The display device of claim 4, wherein, in the threshold voltage compensation period, the compensation transistor and the light emission control transistor are turned on and the scan transistor and the initialization transistor are turned off.

6. The display device of claim 4, wherein, in the threshold voltage compensation period, the compensation transistor is configured to apply the reference voltage to the gate electrode of the driving transistor, and the voltage of the output electrode of the driving transistor is changed to a voltage subtracting the threshold voltage of the driving transistor from the reference voltage.

7. The display device of claim 4, wherein, in the mobility compensation period, the initialization transistor and the light emission control transistor are turned on and the scan transistor and the compensation transistor are turned off.

8. The display device of claim 4, wherein, in the mobility compensation period, the first power voltage becomes equal to the second power voltage.

9. The display device of claim 4, wherein, in the mobility compensation period, the driving current flows through the initialization transistor.

10. The display device of claim 4, wherein, in the first sensing period, the initialization voltage is applied to the initialization voltage line, wherein the sensing driver includes an integrator and an analog-to-digital converter connected to the integrator, wherein, in the second sensing period, the integrator is connected to the initialization voltage line and configured to receive the driving current of the pixels and to output an output voltage, and wherein the analog-to-digital converter is configured to generate the sensing data corresponding to the output voltage.

11. The display device of claim 10, wherein, in the second sensing period, an input electrode of the integrator is connected to the initialization voltage line.

12. The display device of claim 10, wherein the integrator is configured to be connected to the initialization voltage line in the second sensing period and not to be connected to the initialization voltage line in the first sensing period.

13. The display device of claim 10, wherein the sensing driver further includes a first switch configured to selectively apply the initialization voltage to the initialization voltage line in the first sensing period.

14. The display device of claim 10, wherein the sensing driver further includes a second switch connected between the initialization voltage line and the integrator, and configured to selectively connect the integrator to the initialization voltage line in the second sensing period.

15. The display device of claim 4, wherein, in the initialization period, the compensation transistor and the initialization transistor are turned on and the scan transistor and the light emission control transistor are turned off.

16. The display device of claim 4, wherein, in the initialization period, the gate electrode of the driving transistor is configured to be connected to the reference voltage line and the output electrode of the driving transistor is configured to be connected to the initialization voltage line.

17. The display device of claim 4, wherein, in the data writing period, the scan transistor is turned on, and the compensation transistor, the initialization transistor, and the light emission control transistor are turned off.

18. The display device of claim 4, wherein, in the data writing period, the gate electrode of the driving transistor is configured to receive the data voltage.

19. A method of driving a display device, the method comprising:

initializing a voltage of a gate electrode and a voltage of an output electrode of a driving transistor;

storing a threshold voltage of the driving transistor in a first capacitor;

applying a data voltage to a gate electrode of the driving transistor;

generating sensing data by receiving a driving current of the driving transistor of a pixel through an initialization transistor; and generating accumulated image data by accumulating input image data for frames to compensate for the input image data based on the accumulated image data and the sensing data.

20. The method of claim 19, wherein the pixel includes:

the driving transistor configured to generate the driving current;

a scan transistor configured to apply the data voltage to the gate electrode of the driving transistor;

a compensation transistor configured to apply a reference voltage to the gate electrode of the driving transistor;

an initialization transistor configured to apply an initialization voltage to the output electrode of the driving transistor;

a light emission control transistor configured to apply a first power voltage to generate the driving current;

the first capacitor including a first electrode connected to the gate electrode of the driving transistor and a second electrode connected to the output electrode of the driving transistor; and a second capacitor including a first electrode configured to receive the first power voltage and a second electrode connected to the output electrode of the driving transistor.

* * * * *